US010866778B2

(12) United States Patent
Mouyade et al.

(10) Patent No.: US 10,866,778 B2
(45) Date of Patent: Dec. 15, 2020

(54) CROSS DEVICE DISPLAY SYNCHRONIZATION

(71) Applicant: AMADEUS S.A.S., Biot (FR)

(72) Inventors: Jean Mouyade, La Roquette sur Siagne (FR); Sofiane Nait Ouslimane, Cagnes sur Mer (FR); Guillaume Veyre, Antibes (FR); Cyril Colombel, Pégomas (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 16/436,242

(22) Filed: Jun. 10, 2019

(65) Prior Publication Data

US 2019/0391779 A1 Dec. 26, 2019

(30) Foreign Application Priority Data

Jun. 21, 2018 (FR) ...................... 18 55514

(51) Int. Cl.
  *G06F 3/14* (2006.01)
  *G09G 5/00* (2006.01)
  (Continued)

(52) U.S. Cl.
  CPC ........... *G06F 3/1454* (2013.01); *G09G 5/005* (2013.01); *G09G 5/12* (2013.01); *H04L 67/26* (2013.01);
  (Continued)

(58) Field of Classification Search
  CPC ........ G06F 3/1454; G09G 5/005; G09G 5/12; G09G 2320/068; G09G 2354/00; H04L 67/02; H04L 67/26; H04L 67/42
  See application file for complete search history.

(56) References Cited

U.S. PATENT DOCUMENTS 9,124,562 B1 * 9/2015 Currey .................. H04L 67/025
2008/0055191 A1 * 3/2008 Craig .................... G06F 3/1431
  345/2.2
(Continued)

OTHER PUBLICATIONS

National Institute of Industrial Property, Preliminary Search Report and Written Opinion issued in French Patent Application No. 1855514 dated Feb. 22, 2019.

*Primary Examiner* — Amare Mengistu
*Assistant Examiner* — Crystal Mathews
(74) *Attorney, Agent, or Firm* — Thompson Hine LLP

(57) ABSTRACT

Systems and methods for cross device display synchronization using state data. A second identifier uniquely identifying a second device that is represented on a second display of a second device is obtained at a first device with a first display and a first identifier uniquely identifying the first device. An association is created between the first identifier and the second identifier at a real-time database. User interface (UI) state data defining a first UI state of a UI presented on the first display is submitted from the first device to the real-time database via a first network thereby creating replica UI state data on the real-time database. The real-time database pushes the UI state data to the second device via a second network based on the association between the first identifier and the second identifier thereby causing the second device to synchronize a corresponding UI presented on the second display.

36 Claims, 9 Drawing Sheets

(51) Int. Cl.
 *G09G 5/12* (2006.01)
 *H04L 29/08* (2006.01)
 *H04L 29/06* (2006.01)
(52) U.S. Cl.
 CPC ... *G09G 2320/068* (2013.01); *G09G 2354/00* (2013.01); *H04L 67/02* (2013.01); *H04L 67/42* (2013.01)

(56) References Cited

U.S. PATENT DOCUMENTS

| | | | | |
|---|---|---|---|---|
| 2011/0225553 | A1* | 9/2011 | Abramson | G06F 3/0481 715/863 |
| 2012/0303834 | A1* | 11/2012 | Adam | H04L 65/4084 709/231 |
| 2013/0027404 | A1* | 1/2013 | Sarnoff | G06T 1/20 345/441 |
| 2013/0054843 | A1* | 2/2013 | Jan | G06F 3/1454 710/16 |
| 2013/0151653 | A1* | 6/2013 | Sawicki | G06F 15/17331 709/216 |
| 2013/0265487 | A1* | 10/2013 | Yu | H04N 9/12 348/383 |
| 2013/0290882 | A1* | 10/2013 | Cotte | G06F 9/452 715/764 |
| 2015/0061971 | A1* | 3/2015 | Choi | G06F 3/1446 345/2.3 |
| 2015/0082058 | A1* | 3/2015 | Hahm | G06F 3/1454 713/320 |
| 2015/0091903 | A1* | 4/2015 | Costello | G06T 15/20 345/426 |
| 2016/0156713 | A1 | 6/2016 | Zhou et al. | |
| 2016/0259611 | A1* | 9/2016 | Park | G06F 3/1431 |
| 2017/0017450 | A1* | 1/2017 | Bostick | G09G 5/12 |
| 2017/0185421 | A1* | 6/2017 | Ketola | G06F 3/0484 |
| 2017/0220208 | A1* | 8/2017 | Choi | G06T 11/60 |
| 2017/0249919 | A1* | 8/2017 | Bae | H04N 21/234372 |
| 2018/0095656 | A1* | 4/2018 | Ingah | H04N 21/42208 |
| 2019/0377536 | A1* | 12/2019 | Wang | G06F 3/04847 |

* cited by examiner

CROSS DEVICE DISPLAY SYNCHRONIZATION

TECHNICAL FIELD

The present invention relates generally to cross device display synchronization, although not limited thereto. More specifically, the present invention relates to techniques for cross device display synchronization using state data.

BACKGROUND

Various protocols exist for synchronizing a display of one device with a display of another device. Examples of such protocols include the Chromecast protocol developed by Google LLC of Mountain View, Calif.; the Miracast protocol developed by the WiFi Alliance of Austin Tex.; and the AirPlay protocol developed by Apple Inc. of Cupertino, Calif. Using these protocols, a connection may be established between devices for transferring media content (e.g., video, images, etc.) from a first device to a second device for presentation on a display of the second device. In some instances, a media streaming device (e.g., a dongle) may intervene between the first device and the second device to facilitate that connection and transfer of media content.

While each device's corresponding display may be synchronized using these existing protocols, some limitations may be encountered. For example, in accordance with existing protocols, both devices may need to support a common protocol in order to synchronize their respective displays. That is, if the first device supports one protocol (e.g., the Chromecast protocol) and the second device supports another protocol (e.g., the Miracast protocol), the devices may be unable to synchronize their respective displays. As another example, under existing protocols, both devices may display similarly formatted content regardless of each device's respective display characteristics. If the first device is a smartphone and the second device has a display with a screen size that is larger than the smartphone, the content presented on each display may be formatted for presentation on a smartphone display even though the second device has a larger screen size.

Another potential limitation is that bi-directional communication between the devices may not be supported by existing protocols. In other words, a device initiating a media content transfer connection using existing protocols may be designated a "master device" while the other device passively participates in that connection by presenting the media content transferred from the initiating device on its display. The passive participant of that connection generally does not have control over the media content presented on its display. Moreover, both devices generally need to have access rights to a common network in order to establish a media content transfer connection using existing protocols. If the second device is coupled to a particular network, the first device generally needs to have access rights to that particular network in order to synchronize its display with a display of the second device.

SUMMARY

Embodiments of the present invention provide systems, methods, and computer-readable storage media for cross device display synchronization using state data. In an embodiment, a system includes a first device, a processor, and a computer-readable storage medium that includes instructions. Upon execution by the processor, the instructions cause the system to perform operations. The operations include obtaining, at the first device with a first display and a first identifier uniquely identifying the first device, a second identifier presented on a second display of a second device. The second identifier uniquely identifies the second device. An association is created between the first identifier and the second identifier at a real-time database. User interface (UI) state data from the first device is submitted to the real-time database via a first network thereby creating replica user interface (UI) state data on the real-time database. The UI state data defines a first user interface (UI) state of a user interface (UI) presented on the first display. The real-time database is configured to push the UI state data to the second device via a second network based on the association between the first identifier and the second identifier thereby causing the second device to synchronize a corresponding UI presented on the second display with the UI presented on the first display.

In another embodiment, a method includes receiving, at a real-time database via a first network, a first identifier that uniquely identifies a first device having a first display. In response to receiving a binding request that references the first identifier from a second device having a second display via a second network, an association is created between the first identifier and a second identifier that uniquely identifies the second device. Replica user interface (UI) state data is generated using user interface (UI) state data obtained from the second device via the second network. The UI state data defines a first user interface (UI) state of a user interface (UI) presented on the second display. The UI state data is pushed to the first device via the first network based on the association between the first identifier and the second identifier thereby causing the first device to synchronize a corresponding user interface (UI) presented on the first display with the UI presented on the second display.

In another embodiment, a non-transitory computer-readable storage medium including computer-readable instructions is provided. Upon execution by a processor of a computing device, the computer-readable instructions cause the computing device to receive, at a real-time database, a first identifier that uniquely identifies a first device having a first display via a first network. The first identifier is associated with replica user interface (UI) state data for a user interface (UI) of an application. User interface (UI) state data for the UI is synchronized among a plurality of devices including the first device by pushing state change data received by the real-time database that modifies the replica UI state data to each device among the plurality of devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
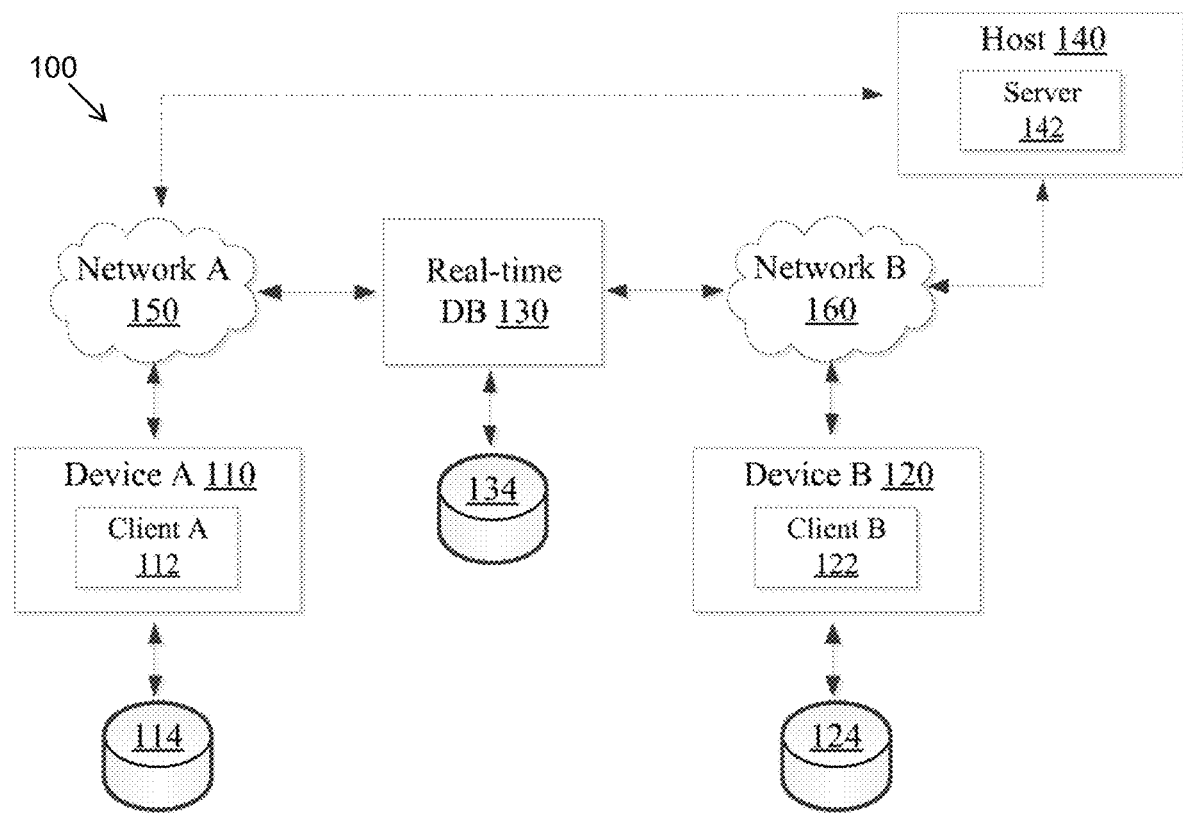
FIG. 1 is a block diagram of an example operating environment that is suitable for implementing aspects of the present invention.

Techniques described herein relate to cross device display synchronization using state data. Referring to FIG. 1, an example operating environment for implementing aspects of the present invention is illustrated and designated generally 100. In general, operating environment 100 represents the various components involved in providing cross device display synchronization. Operating environment 100 includes device A 110, device B 120, real-time database ("DB") 130, and host 140.

FIG. 1 depicts the various components as communicating with each other via networks (e.g., network A 150 and network B 160), which may include one or more public and/or private networks. Examples of networks that are suitable for implementing one or more of network A 150 and network B 160 include: local area networks (LANs), wide area networks (WANs), cellular network, the Internet, and the like. As discussed above, existing protocols for synchronizing content presented on displays of two or more devices generally involve each device being associated with a single network. In contrast, by implementing the techniques described herein, cross device display synchronization may be realized between devices associated with different networks, as illustrated in FIG. 1.

Device A 110 and device B 120 each represent computing devices having a display configured to present content to users. Examples of computing devices suitable for implementing device A 110 and/or device B 120 include: a smartphone, a laptop, a personal computer, a mobile computing device, a tablet, a smart television ("smart TV"), and the like. In an embodiment, device A 110 and device B 120 have disparate operating systems. In an embodiment, device A 110 and device B 120 have distinct form factors in terms of physical size and/or shape. As illustrated in FIG. 1, device A 110 and device B 120 exchange data with external devices (e.g., real-time DB 130 and/or host 140) using different networks. Specifically, device A 110 exchanges data with external devices using network A 150 whereas device B 120 exchanges data with external devices using network B 160.

In operating environment 100, access rights to network A 150 are not granted to device B 120 whereas access rights to network B 160 are not granted to device A 110. In an embodiment, device A 110 and device B 120 may each exchange data with external devices via a single network (e.g., network A 150 or network B 160).

Real-time DB 130 is a backend-as-a-service ("BaaS") provider configured to present an application programming interface ("API") for storing and synchronizing data across multiple clients in real-time and/or near real-time. Through the API of real-time DB 130, each client may interact with replica data residing (or stored) in a data structure 134 associated with real-time DB 130, as described in greater detail below.

One type of content that a display of device A 110 and/or device B 120 may present is a user interface ("UI") associated with an application. The application may be implemented using a client-server architecture, as illustrated in the example of FIG. 1. In the client-server architecture of FIG. 1, the application includes a client-side component (e.g., client A 112 and/or client B 122) and a server-side component (e.g., server 142). In general, the client-side (or front end) component consumes resources and/or services and the server-side (or back end) component provides the resources and/or services. To that end, a connection is established between the client-side and server-side components over a network (e.g., network A 150 and/or network B 160). The client-side and server-side components exchange data in accordance with a communication protocol governing the connection, such as hypertext transfer protocol ("HTTP"), file transfer protocol ("FTP"), Websocket protocol, user datagram protocol ("UDP"), and the like.

The client-side component is generally one or more processes effectuated using a runtime environment of a client-side device, such as device A 110 and/or device B 120. In an embodiment, the runtime environment of the client-side device is an operating system, a web browser, a web browser plug-in, or a mobile application. In an embodiment, the runtime environment of the client-side is JavaScript application. In an embodiment, the client component of the application is retrieved from a server (e.g., host 140 of FIG. 1) hosting the server component of the application. The client-side component is operative to present the UI to a user through which data is obtained from and presented to the user. Data obtained from the user via the UI may be sent as a request to the server-side component of the application. For example, the client-side component may receive input from the user via the UI indicative of a request for content. In response to receiving the input, the client-side component may send that request to the server-side component to obtain the content.

The server-side component is effectuated using computing resources provided by a server-side device, such as real-time DB 130 and/or host 140. The server-side component is operative to serve a response to the client-side component in response to receiving a request from the client-side component. Continuing with the example above, in response to receiving a request for content from the client-side component, the server-side component would serve a response including the requested content to the client-side component. Upon receiving the response, the client-side component would update a state of the UI based on the content included in the response.

As used herein, "state" generally refers to information defining attributes, configurations, and/or quantitative features of an application (or sub-set of the application) at a particular time. For example, the application may have a user interface state ("UI state") that defines what the UI presents to the user (e.g., data, UI elements, and the like) and how to display the UI (e.g., a configuration of the UI). User interface state data ("UI state data") residing (or stored) in a data structure (e.g., data structures 114 and/or 124) associated with the client-side component defines the UI state of the UI at a particular time. In the example above, the client-side component may present the UI in a first state when the input is received from the user. In an embodiment, the UI state data is populated using the client-side component of the application. The client-side component may update UI state data based on the content included in the response thereby modifying the UI from the first UI state to a second UI state.

Figure 10:
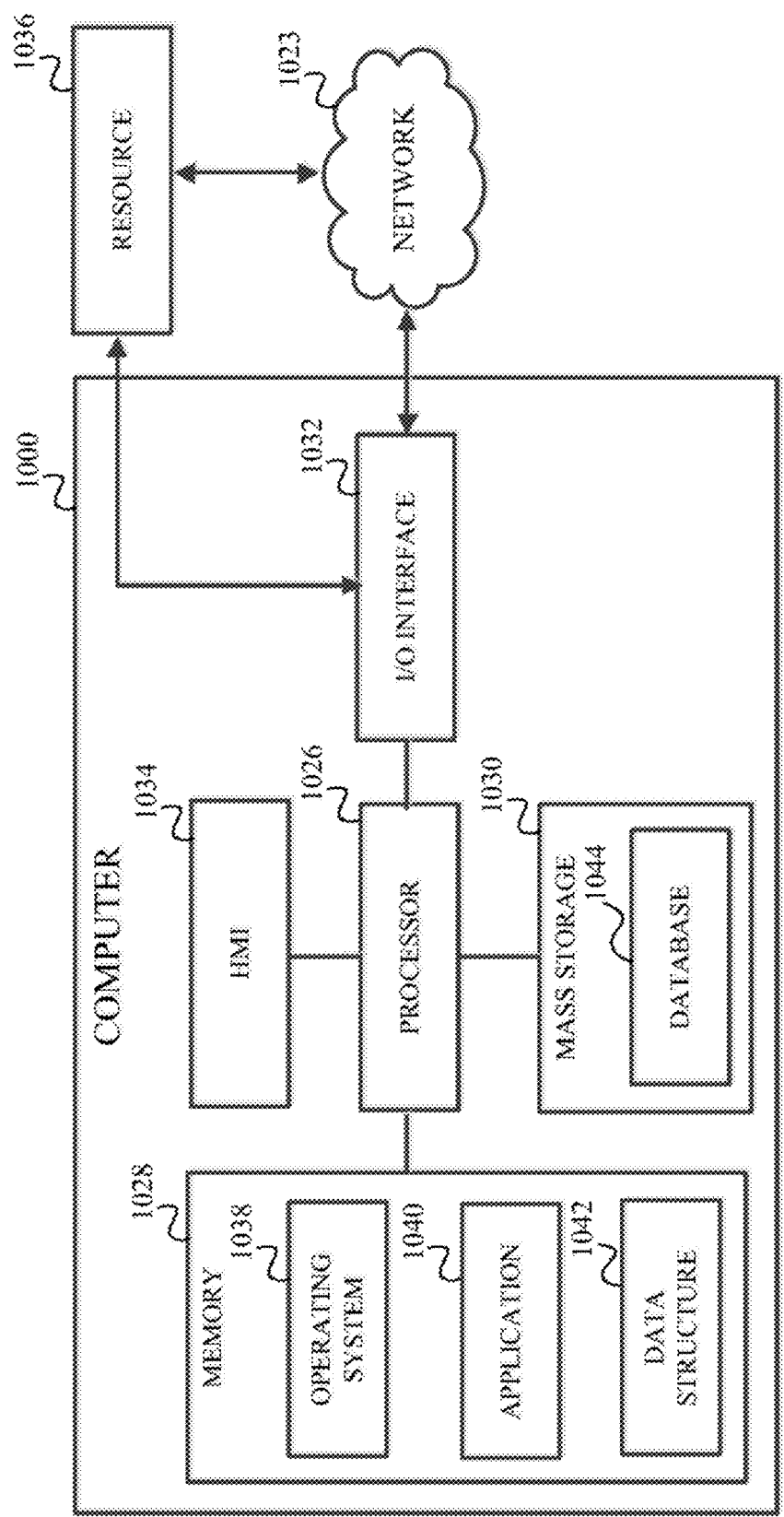
FIG. 10 is a block diagram of an example computing environment suitable for use in implementing embodiments of the invention.

Each of the systems shown in FIG. 1 may be implemented via any type of computing system, such as computing system 1000 described in greater detail below with respect to FIG. 10, for example. Each system shown in FIG. 1 may comprise a single device or multiple devices cooperating in a distributed environment. For instance, real-time DB 130 and/or host 140 may be provided via multiple devices arranged in a distributed environment that collectively provide the functionality described herein. Additionally, other components not shown may also be included within the distributed environment.

Figure 2:
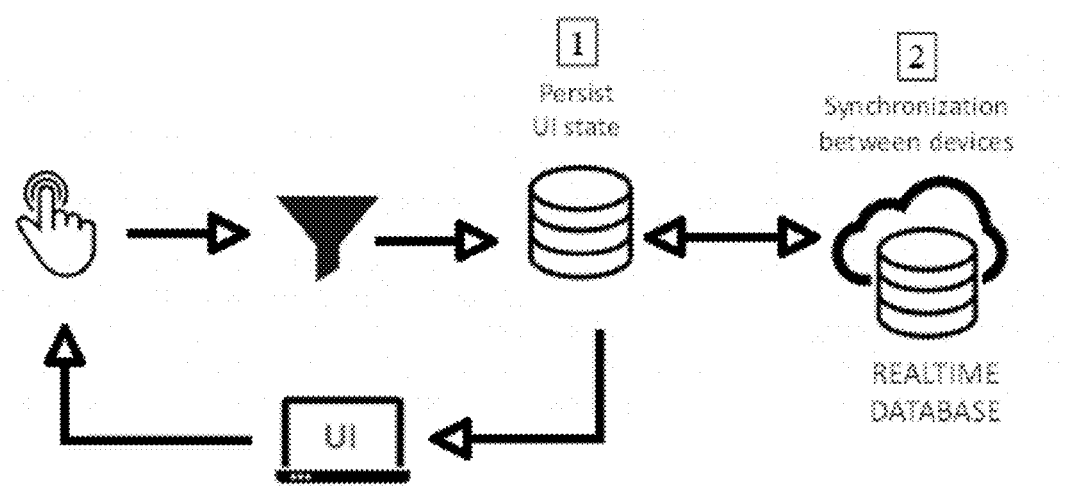
FIG. 2 illustrates a high-level overview of user interface synchronization in accordance with an embodiment of the present invention.

FIG. 2 illustrates a high-level, conceptual overview of aspects of cross device display synchronization in accordance with an embodiment of the present invention. As shown by FIG. 2, one aspect of implementing cross device display synchronization using state data involves maintaining a single, persistent copy of UI state data in a data structure (e.g., data structures 114 and/or 124 of FIG. 1) associated with a client-side component of an application.

To maintain the persistent copy of the UI state data, modifications to existing UI state data defining a current UI state are implemented indirectly by a client-side component. That is, the client-side component returns a new updated UI state when responses to user input is received from a server-side component or state change data is received from a real-time database instead of mutating the current UI state. Modifications to the existing UI state data are thereby centralized and occur in a pre-defined order. The client-side component updates the existing UI state data by applying the pending modification to the current UI state and returning the new updated UI state.

As described in greater detail below, upon updating the UI state data, state change data defining a difference between the current UI state and the new updated UI state is forwarded by the client-side component to a real-time database. Forwarding that state change data initiates a synchronization process in which replica user interface data residing on the real-time database is updated. The synchronization process also involves the real-time database pushing the state change data to other devices thereby causing each device to synchronize a corresponding UI presented on its respective display. The state change data is pushed to the other devices based on an association created at the real-time database between an identifier uniquely identifying a device providing a runtime environment in which the client-side component executes and identifiers uniquely identifying each of the other devices. Examples of suitable identifiers include: a uniform resource locator ("URL"), a tinyURL, an e-mail address, a numeric value, an alphabetic value, an alphanumeric value, and the like.

Figure 3:
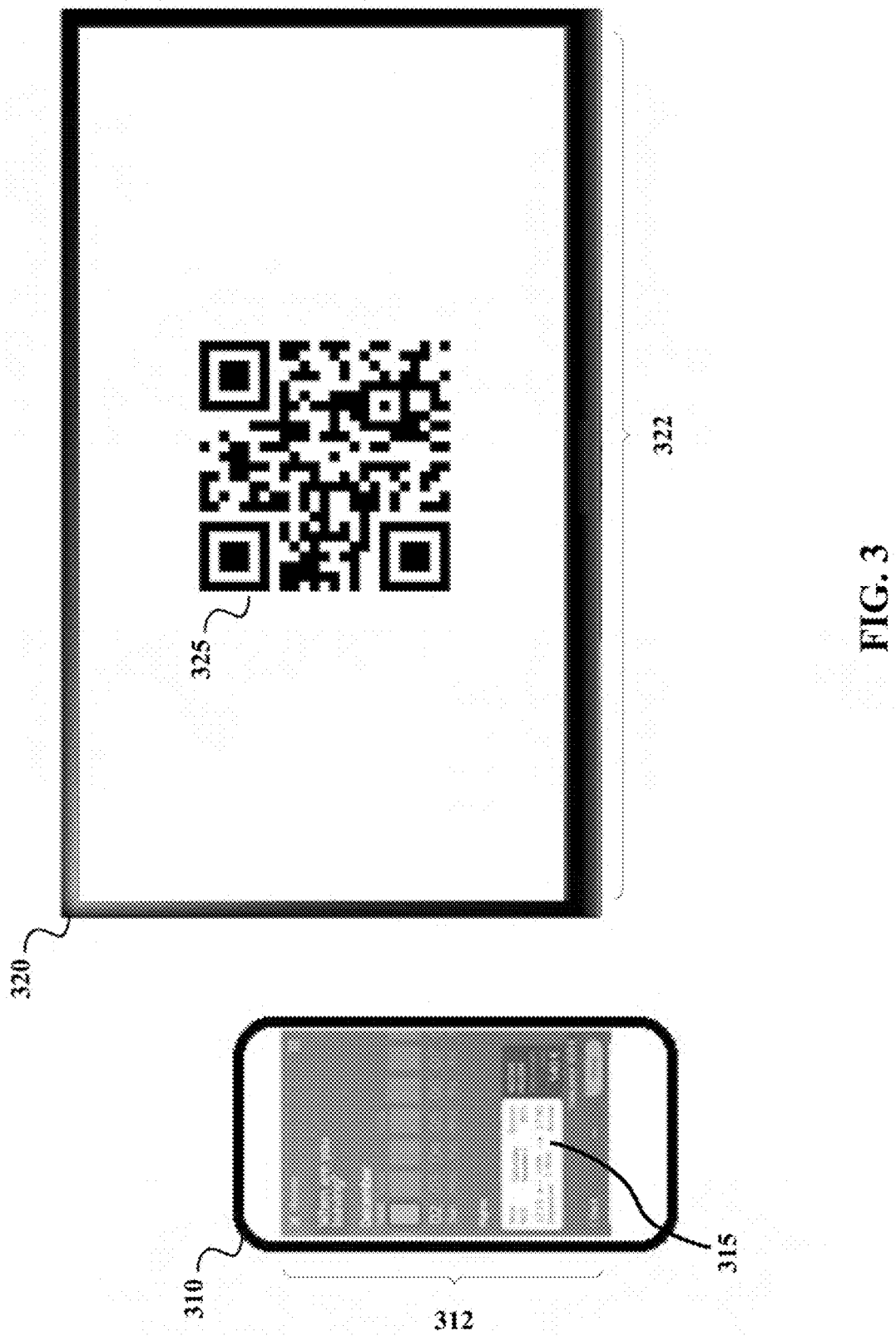
FIG. 3 illustrates example displays presented by two devices before cross device display synchronization.

FIG. 3 illustrates example displays presented by two devices before cross device display synchronization. In FIG. 3, a UI 315 associated with a travel services website is presented on a first display 312 of a first device 310 and a code symbol 325 is presented on a second display 322 of a second device 320 prior to synchronizing the respective displays. The code symbol 325 presented on the second display 322 encodes a second identifier uniquely identifying the second device 320.

While UI 315 is associated with a travel services website in the embodiment illustrated in FIG. 3, one skilled in the art will recognize that UI 315 may also be associated with various types of network (or web) based resources and/or services. For example, UI 315 may also be associated with a web application, a mobile (or native) application, a single-page application, a media streaming website, and the like. In an embodiment, the first device 310 and the second device 320 are implemented using device B 120 and device A 110 of FIG. 1, respectively. In an embodiment, a process executing in a runtime environment of the first device 310 is directed to the travel services website upon obtaining the first identifier.

Here, synchronizing the first display 312 and the second display 322 involves the first device 310 obtaining the second identifier from the code symbol 325 using an image sensor of the first device 310. As described in greater detail below, synchronizing the respective displays involves the first device 310 creating an association between the second identifier and a first identifier (uniquely identifying the first device) at a real-time database. In an embodiment, the first device 310 creates the association by communicating a binding request that references the second identifier to the real-time database.

That synchronization further involves the first device 310 submitting UI state data defining a first state of the UI 315 to the real-time database thereby creating replica UI state data on the real-time database. In an embodiment, the first device 310 submits the UI state data to the real-time database via a first network. In an embodiment, the first network is implemented using network B 160 of FIG. 1. Based on the association between the first identifier and the second identifier, the real-time database is configured to push the UI state data to the second device 320 thereby causing the second device 320 to synchronize the second display 322 with the first display 312. In an embodiment, the real-time database pushes the UI state data to the second device 320 via a second network that is distinct from the first network. In an embodiment, the second network is implemented using network A 150 of FIG. 1. In an embodiment, the real-time database pushes the UI state data to the second device 320 via the first network through which the first device 310 submits the UI state data.

Figure 4:
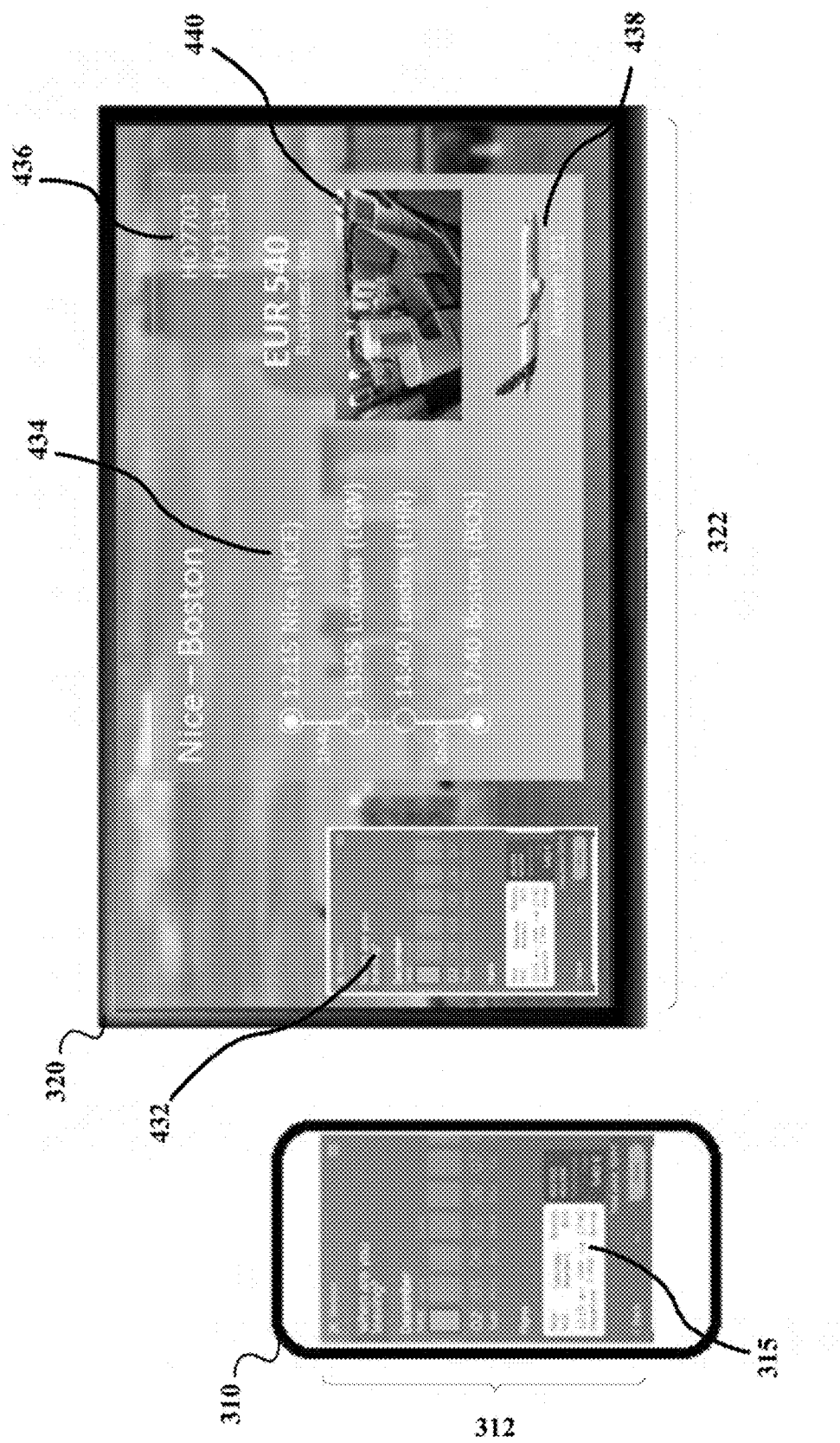
FIG. 4 illustrates example displays presented by two devices following cross device display synchronization.

FIG. 4 illustrates example displays presented by the two devices following cross device display synchronization. As seen in FIG. 4, upon synchronizing the respective displays, the second display 322 presents a UI 432 corresponding to the UI 315 presented on the first display 312. In the example of FIG. 4, the UI 315 presented on the first display 312 and the UI 432 presented on the second display 322 have distinct layouts that are tailored to display characteristics of the first display 312 and the second display 322. Examples of display characteristics include: screen size (e.g., a width and/or a height of a display), pixel density, pixels per inch, display aspect ratio, display refresh rate, and the like. As such, in contrast to some existing techniques, embodiments of the present invention are not limited to displaying similarly formatted content following cross device synchronization.

Here, in addition to presenting a mirrored version 432 of UI 315, UI 432 also includes additional data/content. For example, UI 432 also includes detailed routing information 434 associated with a plurality of travel segments, designators assigned to a travel conveyance servicing each travel segment 436, an image of the travel conveyance 438, and a perspective view 440 depicting a business class cabin of the travel conveyance. In an embodiment, UI 315 represents a mobile version of the travel services website. In an embodiment, UI 432 represents a full (or desktop) version of the travel services website. In an embodiment, the real-time database maintains replica UI state data defining a UI state of multiple versions of a UI.

In an embodiment, the real-time database pushes UI state data defining a UI state of a full version of the travel services website. In this embodiment, by obtaining UI state data corresponding to the full version of the travel services website, second device 320 may present UI 432 on the second display 322 without obtaining content from a server hosting the travel services website. As replica UI state data corresponding to the full version of the travel services website is updated at the real-time database, UI 432 may receive push notifications from the real-time database. Second device 320 is configured to update UI 432 using state change data obtained from such push notifications instead of accessing the server hosting the travel services website for such data, as described in greater detail below. This aspect of the present invention provides for a reduction in the number of content requests received by such servers.

Figure 5:
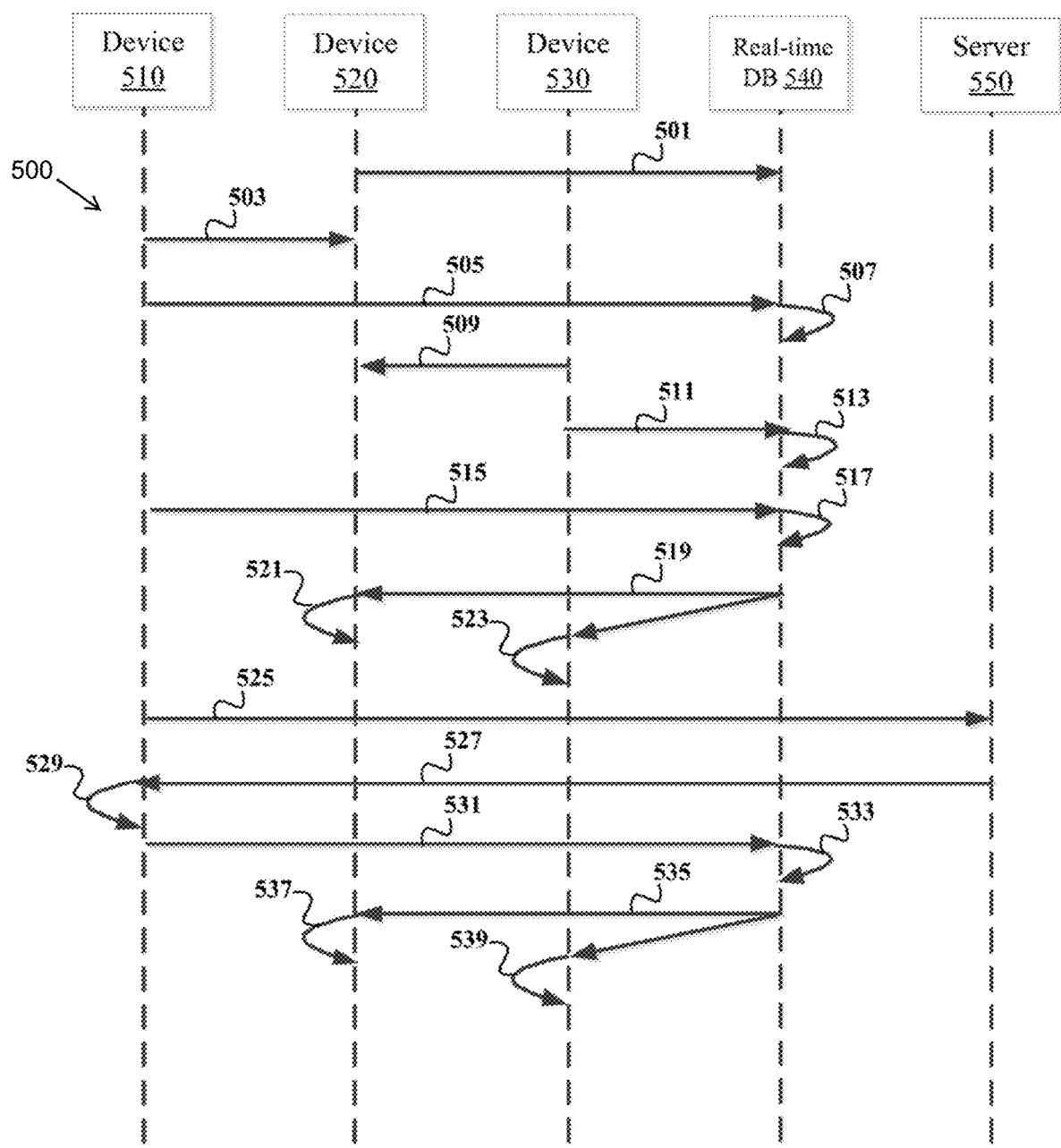
FIG. 5 is a flow diagram depicting an example process for cross device display synchronization using state data.

FIG. 5 is a flow diagram depicting an example process 500 for cross device display synchronization using state data. At step 501, a device 520 having a second display submits a second identifier that uniquely identifies device 520 to real-time database 540. In an embodiment, device 520 is implemented using device A 110 of FIG. 1 and/or device 320 of FIGS. 3-4. In an embodiment, device 520 generates the second identifier. In an embodiment, the second identifier is assigned to device 520 through a registration process with a remote computing device.

A device 510 having a first display obtains the second identifier that is represented on the second display of device 520, at step 503. To create an association between a first identifier that uniquely identifies device 510 and the second identifier at real-time database 540, device 510 communicates a binding request referencing the second identifier to real-time database 540, at step 505. In response to receiving that binding request, real-time database 540 logs the association between the first identifier and the second identifier, at step 507.

A device 530 having a third display obtains the second identifier that is represented on the second display of device 520, at step 509. To create an association between a third identifier that uniquely identifies device 530 and the second identifier at real-time database 540, device 530 communicates a binding request referencing the second identifier to real-time database 540, at step 511. In response to receiving that binding request, real-time database 540 updates the logged association between the first identifier and the second identifier to further include the third identifier, at step 513.

At step 515, device 510 submits UI state data defining a first UI state of a UI presented on the first display to real-time database 540. In an embodiment, the UI state data defining the first UI state is based on content that a process executing in a runtime environment receives from server 550. In an embodiment, device 510 submits the UI state data to real-time database via a first network (e.g., network B 160 of FIG. 1). Upon receiving the UI state data, real-time database 540 creates replica UI state data, at step 517. Based on the association between the first, second, and third identifiers, real-time database 540 pushes the UI state data to both device 520 and device 530, at step 519. In an embodiment, real-time database 540 pushes the UI state data to device 520 and device 530 using push notifications. In an embodiment, real-time database 540 pushes the UI state data to device 520 via a second network and to device 530 via a third network where the first, second, and third networks each correspond to distinct networks. In an embodiment, real-time database 540 pushes the UI state data to device 520 and device 530 via the first network.

In response to receiving the UI state data from real-time database 540, device 520 and device 530 each synchronize corresponding UIs presented on their respective displays, at steps 521 and 523, respectively. In an embodiment, synchronizing a corresponding UI involves a client-side component executing in a runtime environment of device 520 and/or device 530 modifying a persistent copy of UI state data maintained by the client-side component, as discussed above with reference to FIG. 2.

At step 525, a process executing in a runtime environment of device 510 sends a request for content to server 550 using the UI presented on the first display of device 510. Responsive to that request, server 550 serves a response that includes the requested content to the process, at step 527. The process updates the UI presented on the first display of device 510 from the first UI state to a second UI state based on the content in the response, at step 529. In an embodiment, updating the UI from the first UI state to the second UI state involves a client-side component executing in a runtime environment of device 510 modifying a persistent copy of UI state data maintained by the client-side component, as discussed above with reference to FIG. 2.

At step 531, device 510 synchronizes the UI state data with the replica UI state data residing on real-time database 540 by forwarding state change data to real-time database 540. The state change data that device 510 forwards to real-time database 540 defines a difference between the first UI state and the second UI state of the UI presented on the first display of device 510. Upon receiving the state change data, real-time database 540 effectuates a synchronization process in which the replica UI state data is modified based on the state change data, at step 533.

Based on the association between the first, second, and third identifiers, real-time database 540 pushes the state change data to both device 520 and device 530, at step 535. In an embodiment, real-time database 540 pushes the state change data to device 520 and device 530 using push notifications. In response to receiving the state change data from real-time database 540, device 520 and device 530 each synchronize the corresponding UIs presented on their respective displays, at steps 537 and 539, respectively.

Figure 6:
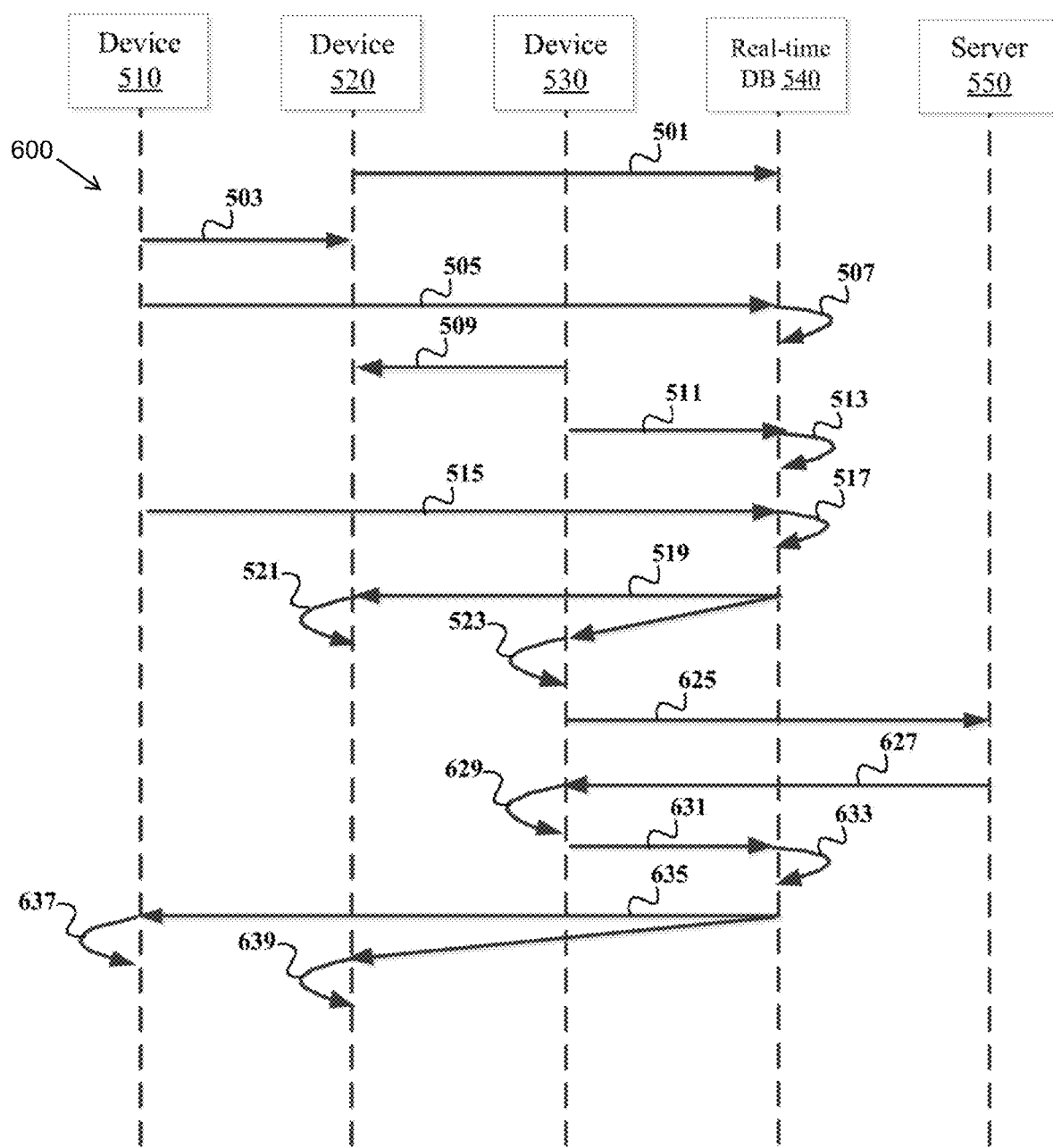
FIG. 6 is a flow diagram depicting another example process for cross device display synchronization using state data.

FIG. 6 is a flow diagram depicting an example process 600 for cross device display synchronization using state data. As seen in FIG. 6, process 600 begins with steps 501-523 from process 500. Process 600 illustrates that once cross device display synchronization has been instantiated, in accordance with embodiments of the present invention, any device presenting a synchronized UI may modify the synchronized UI regardless of which device initiated that synchronization. For example, at step 505, device 510 initiated such synchronization by communicating a binding request referencing the second identifier that uniquely identifies device 520 to real-time database 540. Yet, in process 600, a process executing in a runtime environment of device 530 sends a request for content to server 550 using a corresponding UI presented on the third display of device 530, at step 625.

Responsive to that request, server 550 serves a response that includes the requested content to the process executing in the runtime environment of device 530, at step 627. The process updates the corresponding UI presented on the third display of device 530 from the first UI state to a second UI state based on the content in the response, at step 629. At step 631, device 530 synchronizes the UI state data with the replica UI state data residing on real-time database 540 by forwarding state change data to real-time database 540. The state change data that device 530 forwards to real-time database 540 defines a difference between the first UI state and the second UI state of the corresponding UI presented on the third display of device 530.

Upon receiving the state change data, real-time database 540 effectuates a synchronization process in which the replica UI state data is modified based on the state change data, at step 633. Based on the association between the first, second, and third identifiers, real-time database 540 pushes the state change data to both device 510 and device 520, at step 635. In response to receiving the state change data from real-time database 540, device 510 and device 520 each synchronize the corresponding UIs presented on their respective displays, at steps 637 and 639, respectively.

Figure 7:
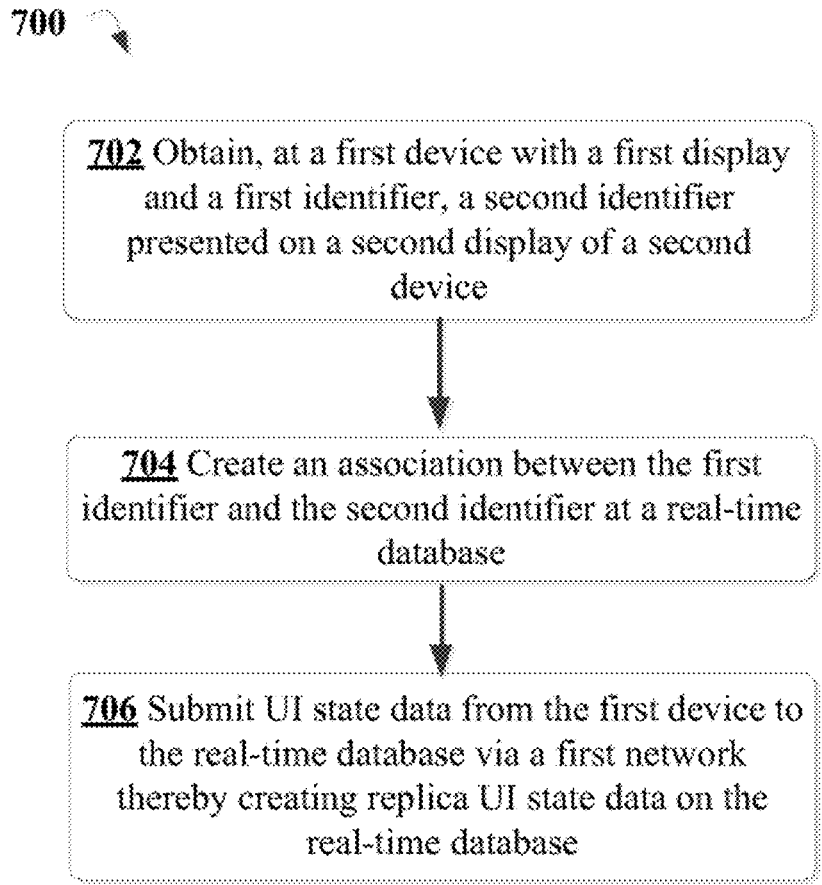
FIG. 7 is a flow-chart illustrating an example of a method of cross device display synchronization using state data.

Referring to FIG. 7, an example process 700 of cross device display synchronization using state data is illustrated. In an embodiment, process 700 is effectuated by device B 120 of FIG. 1. At block 702, a second identifier presented on a second display of a second device is obtained at a first device with a first display and a first identifier. The first identifier and the second identifier uniquely identify the first device and the second device, respectively. In an embodiment, the first device includes an image sensor and the second identifier is obtained from a code symbol presented on the second display using the image sensor.

At block 704, an association is created between the first identifier and the second identifier at a real-time database. In an embodiment, the association is created by submitting a binding request to the real-time database that references the second identifier. At block 706, UI state data from the first device is submitted to the real-time database via a first network thereby creating replica UI state data on the real-time database. The UI state data from the first device defines a first UI state of a UI presented on the first display. The real-time database is configured to push the UI state data to the second device based on the association between the first identifier and the second identifier.

In an embodiment, the UI state data stored on the first device is updated in response to receiving push notifications from the real-time database when the replica UI state data is modified by a third device through a synchronization process. In an embodiment, the third device is communicatively coupled to the real-time database via a third device that is distinct from the first network and/or the second network.

Figure 8:
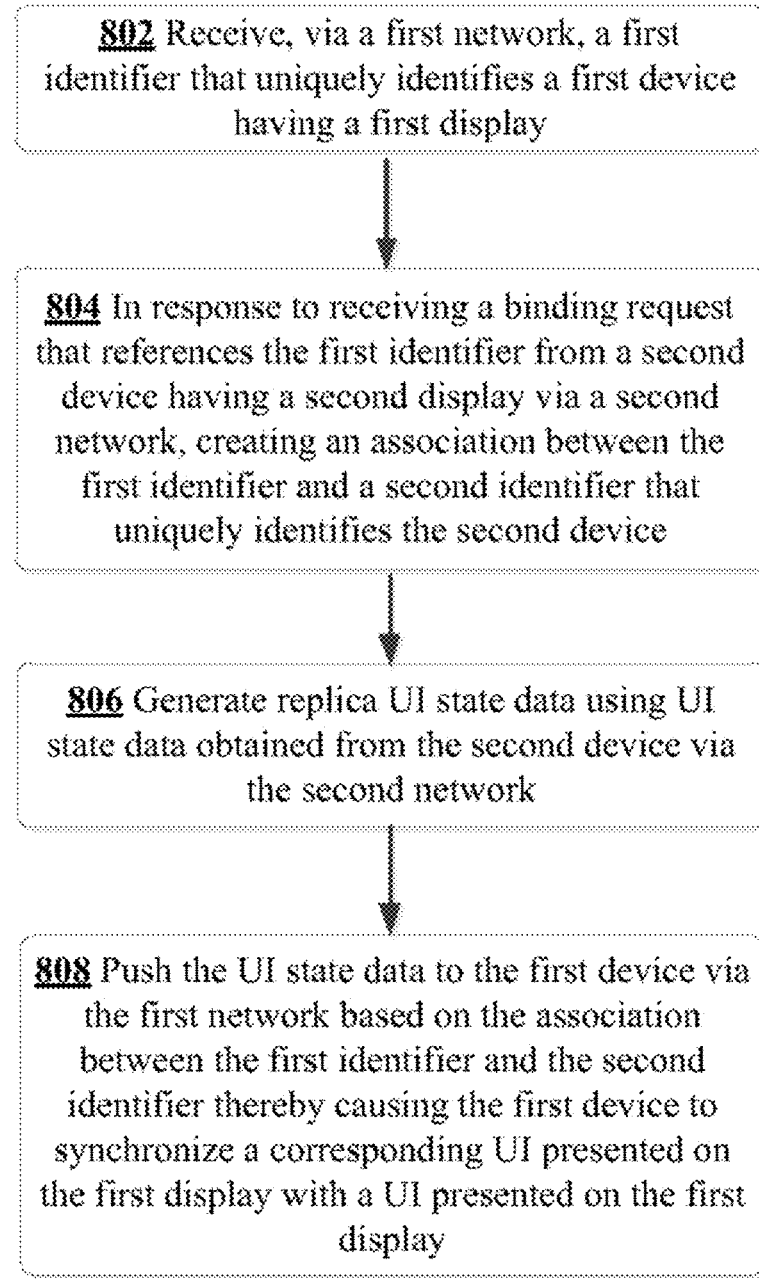
FIG. 8 is a flow-chart illustrating another example of a method of cross device display synchronization using state data.

Referring to FIG. 8, another example process 800 of cross device display synchronization using state data is illustrated. In an embodiment, process 800 is effectuated by real-time database 130 of FIG. 1 and/or real-time database 540 of FIGS. 5-6. At block 802, a first identifier that uniquely identifies a first device having a first display is received at a real-time database via a first network. At block 804, in response to receiving a binding request that references the first identifier from a second device having a second display via a second network, an association is created between the first identifier and a second identifier that uniquely identifies the second device.

At block 806, replica UI state data is generated using UI state data obtained from the second device. In an embodiment, the UI state data is obtained from the second device via a second network that is distinct from the first network. In an embodiment, the UI state data is obtained from the second device via the first network. At block 808, the UI state data is pushed to the first device via the first network based on the association between the first identifier and the second identifier. Pushing the UI state data to the first device causes the first device to synchronize a corresponding UI presented on the first display with a UI presented on the second display.

In an embodiment, the binding request is one of a plurality of binding requests received by the real-time database via networks external to the first network that each reference the first identifier. In an embodiment, each binding request among the plurality of binding requests include a respective identifier that uniquely identifies a corresponding device submitting that binding request. In an embodiment, the first identifier is obtained from the first display by at least one device that submitted one of the plurality of binding requests. In an embodiment, at least one device that submitted one of the plurality of binding request received the first identifier from another device that submitted one of the plurality of binding requests.

In an embodiment, state change data defining a difference between the first UI state and a second UI state of the UI is received from the second device. In an embodiment, the state change data is pushed to each device that submitted one of the plurality of binding requests upon updating the replica state UI data using the state change data. In an embodiment, the state change data is pushed to a subset of devices that submitted one of the plurality of binding requests upon updating the replica state UI data using the state change data. In an embodiment, state change data defining a difference between the first UI state and a second UI state of the UI is received from the first device or any device that submitted one of the plurality of binding requests. In an embodiment, the state change data is pushed to the second device upon updating the replica state UI data using the state change data.

In an embodiment, state change data is received from the second device that includes inertial data corresponding to movement of the second device. In an embodiment, the inertial data is generated by an inertial measurement unit ("IMU") of the second device. The IMU being a computing device that provides inertial data by sampling signals generated by one or more sensors of the IMU. The one or more sensors may include one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, a barometric pressure sensor for measuring atmospheric pressure, and the like. In an embodiment, the corresponding UI presented on the first display includes a perspective view (e.g., perspective view 440 of FIG. 4) with a viewing angle that is adjusted based on the inertial data.

Figure 9:
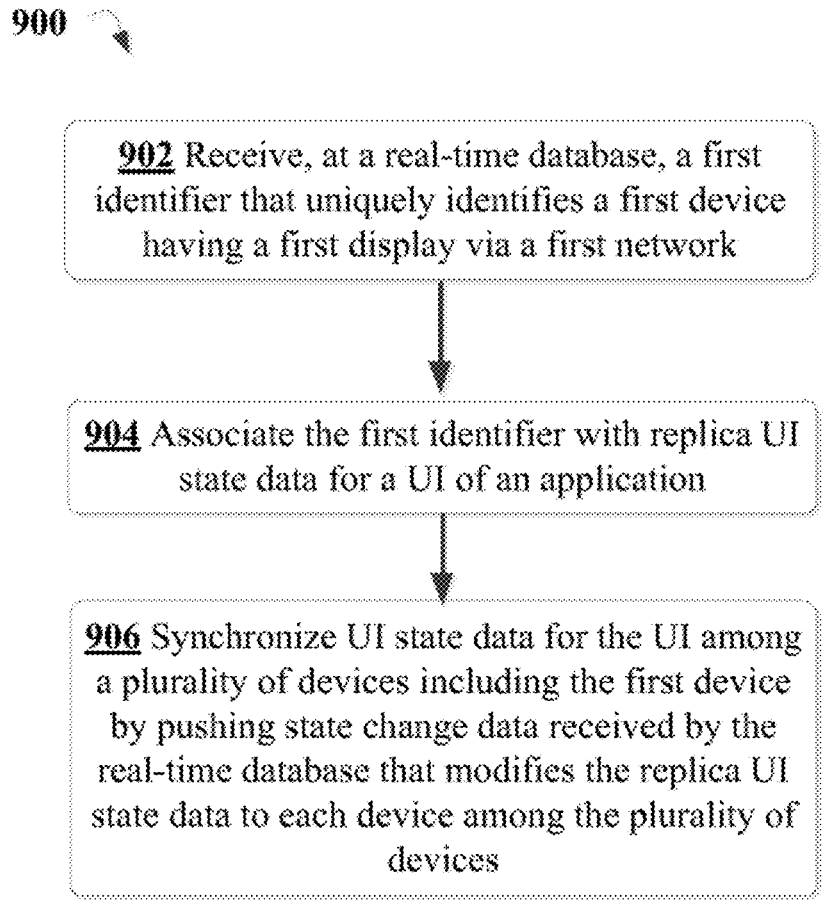
FIG. 9 is a flow-chart illustrating another example of a method of cross device display synchronization using state data.

Referring to FIG. 9, another example process 900 of cross device display synchronization using state data is illustrated. In an embodiment, process 900 is effectuated by real-time database 130 of FIG. 1 and/or real-time database 540 of FIGS. 5-6. At block 902, a first identifier that uniquely identifies a first device having a first display is received at a real-time database via a first network. At block 904, the first identifier is associated with replica UI state data for a UI of an application. At block 906, UI state data is synchronized for the UI among a plurality of devices including the first device by pushing state change data received by the real-time database that modifies the replica UI state data to each device among the plurality of devices.

In an embodiment, conflicts identified in the state change data that is received by the real-time database are resolved by buffering the state change data in a first-in-first-out queue, buffering the state change data in a last-in-first-out queue, or determining an average value for the identified conflicts and including the average value in the state change data pushed to each device among the plurality of devices. In an embodiment, conflicts identified in the state change data that is received by the real-time database are resolved by designating one device among the plurality of devices as a master device.

In an embodiment, process 700, process 800, and/or process 900 is performed by processing logic, including hardware, firmware, software, or a combination thereof. In an embodiment, process 700, process 800, and/or process 900 is performed by a processor executing code stored in a non-transitory computer-readable medium (e.g., a memory).

Having described various embodiments of the invention, an exemplary computing environment suitable for implementing embodiments of the invention is now described. With reference to FIG. 10, device A 110, device B 120, real-time database 130, host 140, device 310, device 320, device 510, device 520, device 530, real-time database 540, and server 550 may be implemented on one or more computer devices or systems, such as exemplary computer system 1000. The computer system 1000 may include a processor 1026, a memory 1028, a mass storage memory device 1030, an input/output (I/O) interface 1032, and a Human Machine Interface (HMI) 1034. The computer system 1000 may also be operatively coupled to one or more external resources 1036 via the network 1023 or I/O interface 1032. External resources may include, but are not limited to, servers, databases, mass storage devices, peripheral devices, cloud-based network services, or any other suitable computer resource that may be used by the computer system 1000.

The processor 1026 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1028. The memory 1028 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1030 may include data storage devices such as a hard drive, optical drive, tape drive, non-volatile solid state device, or any other device capable of storing information.

The processor 1026 may operate under the control of an operating system 1038 that resides in the memory 1028. The operating system 1038 may manage computer resources so that computer program code embodied as one or more computer software applications, such as an application 1040 residing in memory 1028, may have instructions executed by the processor 1026. In an alternative embodiment, the processor 1026 may execute the application 1040 directly, in which case the operating system 1038 may be omitted. One or more data structures 1042 may also reside in memory 1028, and may be used by the processor 1026, operating system 1038, or application 1040 to store or manipulate data.

The I/O interface 1032 may provide a machine interface that operatively couples the processor 1026 to other devices and systems, such as the network 1023 or the one or more external resources 1036. The application 1040 may thereby work cooperatively with the network 1023 or the external resources 1036 by communicating via the I/O interface 1032 to provide the various features, functions, applications, processes, or modules comprising embodiments of the invention. The application 1040 may also have program code that is executed by the one or more external resources 1036, or otherwise rely on functions or signals provided by other system or network components external to the computer system 1000. Indeed, given the nearly endless hardware and software configurations possible, persons having ordinary skill in the art will understand that embodiments of the invention may include applications that are located externally to the computer system 1000, distributed among multiple computers or other external resources 1036, or provided by computing resources (hardware and software) that are provided as a service over the network 1023, such as a cloud computing service.

The HMI 1034 may be operatively coupled to the processor 1026 of computer system 1000 in a known manner to allow a user to interact directly with the computer system 1000. The HMI 1034 may include video or alphanumeric displays, a touch screen, a speaker, and any other suitable audio and visual indicators capable of providing data to the user. The HMI 1034 may also include input devices and controls such as an alphanumeric keyboard, a pointing device, keypads, pushbuttons, control knobs, microphones, etc., capable of accepting commands or input from the user and transmitting the entered input to the processor 1026.

A database 1044 may reside on the mass storage memory device 1030, and may be used to collect and organize data used by the various systems and modules described herein. data structure 114, data structure 124, and data structure 134 may be implemented using one or more databases, such as database 1044. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1026 may be used to access the information or data stored in records of the database 1044 in response to a query, where a query may be dynamically determined and executed by the operating system 1038, other applications 1040, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. In an embodiment, computer readable storage media includes a chipset of a television that is operative to transition the television to a browser mode. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system comprising:
   a first device with a first display and a first identifier uniquely identifying the first device;
   a processor; and
   a computer-readable storage medium comprising instructions that upon execution by the processor cause the system to perform operations, the operations comprising:
   receiving, at the first device from a server, user interface (UI) state data, wherein the UI state data defines a first user interface (UI) state of a user interface (UI) presented on the first display;
   obtaining, at the first device, a second identifier represented on a second display of a second device, the second identifier uniquely identifying the second device;
   creating an association between the first identifier and the second identifier at a real-time database that is separate from the server; and
   submitting the UI state data from the first device to the real-time database via a first network, wherein:
   replica user interface (UI) state data is created on the real-time database in response to receiving the UI state data from the first device,
   the real-time database is configured to push the UI state data to the second device via a second network based on the association between the first identifier and the second identifier without communication with the server,
   pushing the replica UI state data to the second device causes the second device to synchronize a corresponding UI presented on the second display with the UI presented on the first display, and
   the second network is distinct from the first network.

2. The system of claim 1, wherein the instructions, when executed, further cause the system to perform additional operations, the additional operations comprising:
   synchronizing the UI state data with the replica UI state data by forwarding state change data to the real-time database, the state change data defining a difference between the first UI state and a second UI state of the UI, wherein the real-time database is configured to push the state change data to the second device via the second network based on the association between the first identifier and the second identifier thereby causing the second device to synchronize the corresponding UI presented on the second display with the UI presented on the first display.

3. The system of claim 2, wherein the state change data includes at least a subset of content that a process executing in a runtime environment of the first device receives from a server component of an application associated with the UI in response to a request for content that the process sends to the server component using the UI, wherein the server hosts the server component of the application.

4. The system of claim 3, wherein the runtime environment is a mobile application that includes a client component of the application.

5. The system of claim 3, wherein the runtime environment is a web browser.

6. The system of claim 5, wherein the request for content is sent to the server component of the application by a client component of the application retrieved from the server hosting the server component of the application.

7. The system of claim 3, wherein the process executing in the runtime environment of the first device is directed to the server component of the application upon obtaining the second identifier.

8. The system of claim 2, wherein the UI is updated from the first UI state to the second UI state based on content that a process executing in a runtime environment of the first device receives from a server component of an application associated with the UI in response to a request for the content that the process sends to the server component using the UI.

9. The system of claim 8, wherein the runtime environment is a mobile application that includes a client component of the application.

10. The system of claim 8, wherein the runtime environment is a web browser.

11. The system of claim 10, wherein the request for content is sent to the server component of the application by a client component of the application retrieved from a server hosting the server component of the application.

12. The system of claim 8, wherein the process executing in the runtime environment of the first device is directed to the server component of the application upon obtaining the second identifier.

13. The system of claim 1, wherein the first device includes an image sensor, and the second identifier is obtained from a code symbol presented on the second display using the image sensor.

14. The system of claim 1, wherein the first device and the second device have distinct form factors or disparate operating systems.

15. The system of claim 1, wherein the instructions, when executed, further cause the system to perform additional operations, the additional operations comprising:
receiving push notifications from the real-time database at the first device via the first network when the replica UI state data is modified by the second device through a synchronization process based on the association between the first identifier and the second identifier.

16. The system of claim 15, wherein the push notifications from the real-time database are received at a third device via a third network based on an association at the real-time database between the first identifier, the second identifier, and a third identifier uniquely identifying the third device.

17. The system of claim 1, wherein the instructions, when executed, further cause the system to perform additional operations, the additional operations comprising:
updating the UI state data stored on the first device in response to receiving push notifications from the real-time database when the replica UI state data is modified by a third device through a synchronization process, wherein the third device is communicatively coupled to the real-time database via a third network that is distinct from the first network and the second network.

18. The system of claim 1, wherein one or more of the first identifier and the second identifier is a uniform resource locator (URL), a tinyURL, an e-mail address, a numeric value, an alphabetic value, or an alpha-numeric value.

19. The system of claim 1, wherein the UI presented on the first display includes content received from a server component of an application associated with the UI, and synchronizing the corresponding UI presented on the second display with the UI presented on the first display enables the second device to populate the corresponding UI with the content without submitting a request to the server component for the content.

20. The system of claim 1, wherein the instructions, when executed, further cause the system to perform additional operations, the additional operations comprising:
updating the UI state data stored on the first device in response to receiving push notifications from the real-time database when the replica UI state data is modified by the second device through a synchronization process, the second device modifying the replica UI state data using content received by the second device from a server component of an application associated with the UI in response to a request for the content sent to the server component using the corresponding UI.

21. The system of claim 1, wherein the corresponding UI presented on the second display comprises the UI that was presented on the first display and additional content.

22. The system of claim 21, wherein the additional content is based on the UI state data.

23. A method comprising:
at a real-time database:
receiving, via a first network, a first identifier that uniquely identifies a first device having a first display;
in response to receiving a binding request that references the first identifier from a second device having a second display via a second network that is distinct from the first network, creating an association between the first identifier and a second identifier that uniquely identifies the second device, wherein the second device is configured to receive, from a server that is separate from the real-time database, user interface (UI) state data, wherein the UI state data defines a first user interface (UI) state of a user interface (UI) presented on a display of the second device;
generating replica user interface (UI) state data using the UI state data obtained from the second device via the second network, the UI state data defining a first UI state of a UI presented on the second display; and
pushing the UI state data to the first device via the first network based on the association between the first identifier and the second identifier thereby causing the first device to synchronize a corresponding user interface (UI) presented on the first display with the UI presented on the second display.

24. The method of claim 23, wherein the binding request is one of a plurality of binding requests received by the real-time database via networks external to the first network that each reference the first identifier, and each binding request among the plurality of binding requests includes a respective identifier that uniquely identifies a corresponding device submitting that binding request.

25. The method of claim 24, further comprising:
pushing state change data received from the second device to each device that submitted one of the plurality of binding requests upon updating the replica state UI data using the state change data that defines a difference between the first UI state and a second UI state of the UI.

26. The method of claim 24, further comprising:
pushing state change data received from the second device to a subset of devices that submitted one of the plurality of binding requests upon updating the replica state UI data using the state change data that defines a difference between the first UI state and a second user interface (UI) state of the UI.

27. The method of claim 24, further comprising:
pushing state change data received from the first device or any device that submitted one of the plurality of binding requests to the second device upon updating the replica state UI data using the state change data that defines a difference between the first UI state and a second user interface (UI) state of the UI.

28. The method of claim 24, wherein the first identifier is obtained from the first display by at least one device that submitted one of the plurality of binding requests.

29. The method of claim 23, wherein the corresponding UI and the UI have distinct layouts that are tailored to display characteristics of the first display and the second display, respectively.

30. The method of claim 23, wherein the UI state data is populated using a client component of an application associated with the UI, the client component executing in a runtime environment of the second device.

31. The method of claim 30, wherein the runtime environment is an operating system, a web browser, a web browser plug-in, or a mobile application.

32. The method of claim 23, further comprising:
receiving state change data from the second device that includes inertial data corresponding to movement of the second device.

33. The method of claim 32, wherein the corresponding UI presented on the first display includes a perspective view with a viewing angle that is adjusted based on the inertial data.

34. A non-transitory computer-readable storage medium comprising computer-readable instructions that upon execution by a processor of a computing device cause the computing device to:
at a real-time database:
receive a first identifier that uniquely identifies a first device having a first display via a first network, wherein the first device is configured to receive, from a server that is separate from the real-time database, user interface (UI) state data, wherein the UI state data defines a first user interface (UI) state of a user interface (UI) presented on a display of the first device;
associate the first identifier with replica user interface (UI) state data for a user interface (UI) of an application; and
synchronize the UI state data for the UI among a plurality of devices including the first device by pushing state change data received by the real-time database that modifies the replica UI state data to each device among the plurality of devices.

35. The non-transitory computer-readable storage medium of claim 34, wherein conflicts identified in the state change data that is received by the real-time database are resolved by buffering the state change data in a first-in-first-out queue, buffering the state change data in a last-in-first-out queue, or determining an average value for the conflicts and including the average value in the state change data pushed to each device among the plurality of devices.

36. The non-transitory computer-readable storage medium of claim 34, wherein conflicts identified in the state change data that is received by the real-time database are resolved by designating one device among the plurality of devices as a master device.

\* \* \* \* \*